United States Patent Office 2,770,165
Patented Nov. 13, 1956

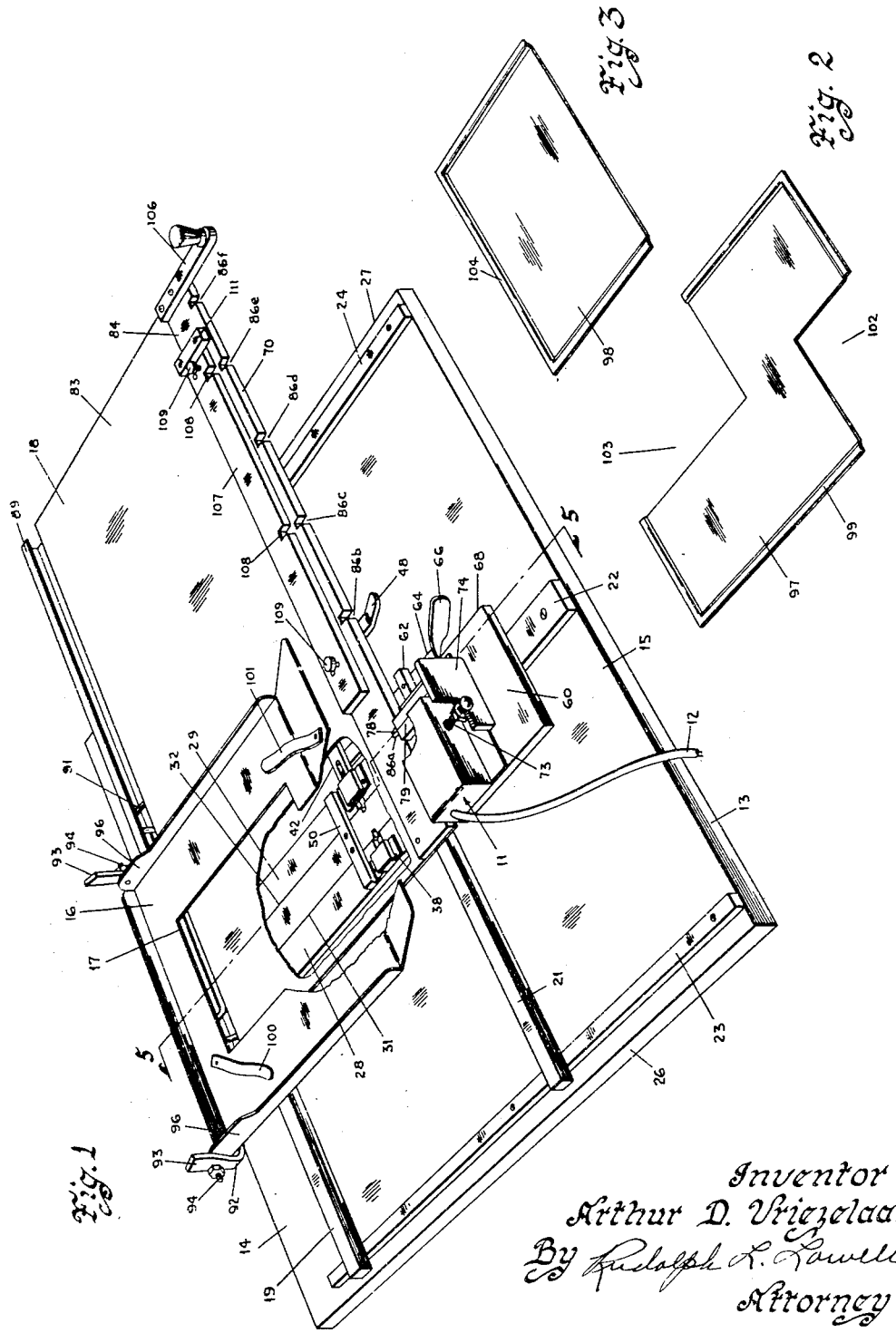

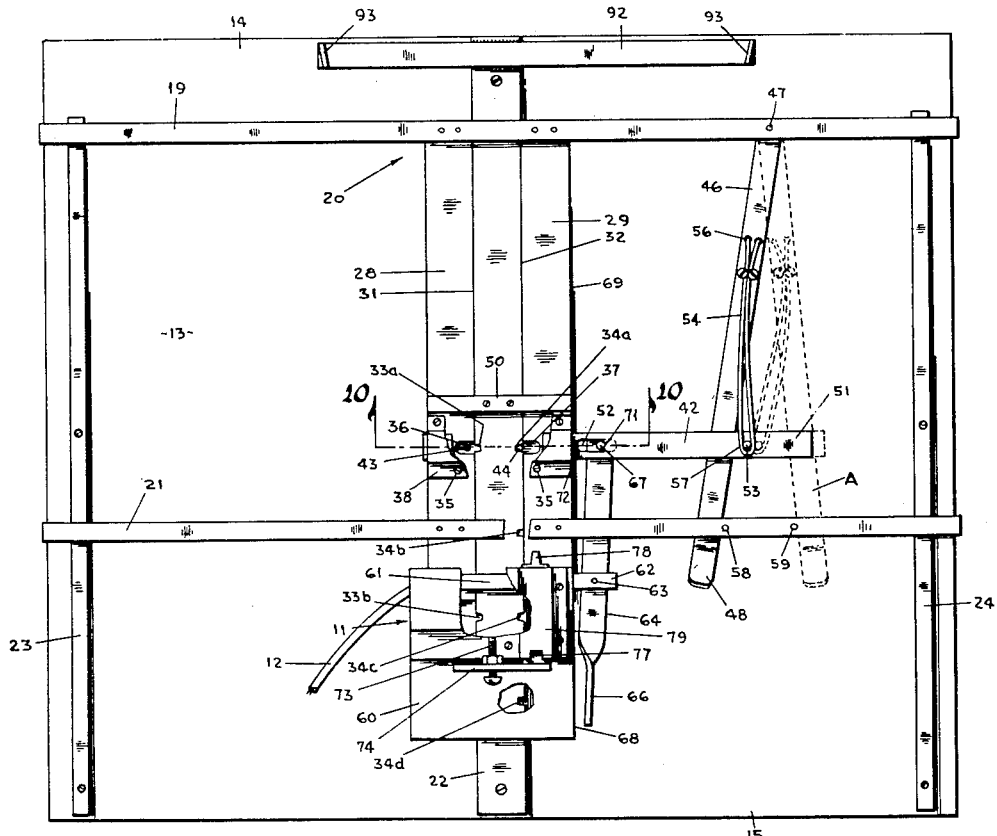

2,770,165

PHOTOGRAPHIC EXPOSURE DEVICE

Arthur D. Vriezelaar, Monroe, Iowa

Application May 13, 1953, Serial No. 354,751

2 Claims. (Cl. 88—24)

This invention relates generally to a photographic exposure device and more particularly to an exposure device which provides for the printing of a number of photographs on a single sheet of paper.

An object of this invention is to provide an improved photographic exposure device.

A further object of this invention is to provide a carriage for carrying a sheet of photographic paper relative to an apertured plate, with the carriage being mounted for movement relative to the plate in right angle directions for progressively exposing the surface of the sheet of paper to the plate aperture without moving the paper relative to the carriage.

A further object of this invention is to provide an exposure device for use with a photographic printer, in which a paper carrying carriage is movable to position a sheet of printing paper thereon relative to the printer to provide for the printing of a series of rows of pictures on the paper, and with a switch, actuated by movement of the paper carriage, being adapted to control the exposure time of the printer.

Another object of this invention is to provide a photographic exposure device in which a carriage for carrying a sheet of photographic paper relative to a plate having an aperture formed therein, is provided with interchangeable inserts for positioning in the plate aperture to expose areas of varying sizes on the paper.

A further object of this invention is to provide a photographic exposure device in which a paper carrying carriage is movable on a track member that is formed with notches on the opposite sides thereof. The carriage is provided with a pair of notch engaging members corresponding to the notches on the sides of the track member, and a notch selector means for selectively engaging a notch engaging member with its corresponding notches on the track member.

A further object of this invention is to provide a photographic exposure device in which a paper carrying carriage, mounted for movement relative to an apertured plate member, is provided along one side thereof with a notched bar movable relative to a spring biased notch engaging member for determining stop positions for the carriage.

Yet another object of this invention is to provide an exposure device which is rugged in construction, economical to manufacture and efficient in operation in the printing of one or more rows of photographs on a single sheet of photographic paper.

Further objects, features and advantages of this invention will be apparent from a consideration of the following description when taken in connection with the accompanying drawing in which:

Fig. 1 is a perspective view of the exposure device of this invention with parts broken away and shown in section for the purpose of clarity;

Figs. 2 and 3 are perspective views of aperture plate inserts used in the exposure device;

Fig. 4 is a top plan view of the exposure device with the aperture plate and paper carriage removed and with parts broken away for the purpose of clarity;

Fig. 5 is a sectional view of the exposure device looking along line 5—5 in Fig. 1;

Figs. 6, 7, 8 and 9 are diagrammatic plan views showing the plate inserts of Figs. 2 and 3 in various positions with the aperture plate; and Fig. 10 is a sectional detail view as seen along the line 10—10 in Fig. 4.

The photographic exposure device of this invention is adapted for use with a photographic projection printer of a well known type, wherein the negative of the picture to be printed is mounted on the printer and it is only necessary to expose photographic paper to light from the printer to obtain a picture on the paper. With reference to the drawing, the device is illustrated in Figs. 1 and 4 as including a micro-switch mechanism 11 having an electrical connection 12 with a photographic timer (not shown), which controls the light exposure of the photographic printer (not shown). Thus, each time the micro-switch 11 is actuated, the photographic printer is operated to print a picture on paper carried by the exposure device, as will appear later.

The exposure device has a rectangular base or support member 13 to the end 14 of which is pivotally secured, for up and down movement, an aperture plate 16 formed with a central opening or aperture 17 of a substantially rectangular shape. The aperture plate 16, in its operative position, is horizontally arranged in a vertically spaced parallel relation with the base 13 (Figs. 1 and 5). Positioned between the aperture plate 16 and the base 13 is a paper holding or carrying carriage 18 mounted for sliding movement on a pair of transversely spaced track members 19 and 21 extended longitudinally of the base 13. For convenience of description, the end 14 of the base 13 will hereinafter be referred to as the rear end with the opposite end 15 being referred to as the front end of the base 13. The track members 19 and 21 are in turn mounted for sliding movement on a central track member 22 and end track members 23 and 24 extended transversely, and spaced longitudinally, of the base member 13.

Thus, the paper carriage 18 is mounted for movement both longitudinally and transversely of the base 13 and since the aperture plate 16 is secured to the base 13, the carriage 18 is movable in right angle directions relative to the aperture plate 16. As a result, with a photographic printer positioned above and arranged to direct light to the opening 17 in the aperture plate 16, the carriage 18 can be manipulated to provide for the printing of one or more rows of pictures on a sheet of paper carried by the carriage 18.

The track members 22, 23 and 24 are secured in a parallel relation to the top side of the base 13, with the track members or support bars 23 and 24 positioned adjacent the opposite sides 26 and 27 of the base 13. For convenience of description, the side 26 of the base 13 will hereinafter be referred to as the left side and the side 27 the right side of the base 13.

A carriage support frame, indicated generally at 20, for the carriage 18 (Fig. 4) includes the track members 19 and 21 the ends of which ride on the bars 23 and 24 and the central portions of which ride or rest on the track member 22, it being understood that the bars 23 and 24 and the track member 22 are of the same thickness so that their top sides are in a common plane. Attached to the bottom sides of the tracks 19 and 21 are a pair of spaced apart parallel guide bars 28 and 29 for receiving therebetween the central track member 22 so that the guide bars 28 and 29 are arranged adjacent the opposite sides 31 and 32, respectively, of the track 22. The track 22 is formed in its sides 31 and 32 with notches 33a and b and 34a–d, inclusive, respectively, spaced longitudinally of the track 22, with the notches 34a–d, inclusive, in the side 32 being four in number and the notches 33a and b in the side 31, two in number. As best appears in Fig. 4 the distance between the notches 33a and 33b is twice the distance between adjacent notches 34a–d, inclusive, and with the rearmost notches indicated as 33a and 34a being positioned opposite each other. A pair of oppositely disposed enlarged recesses or notches 36 and 37 are formed in the guide bars 28 and 29 respectively, adjacent to and rearwardly of the track 21.

Secured to, as by screws 35, and extended between the bars 28 and 29 so as to overlie the enlarged notches 36 and 37 is a guide member 38 of a substantially inverted U-shape in transverse section. Mounted for sliding movement within the guide member 38 and on the top sides of the bars 28 and 29 is a shift bar 42 which extends longitudinally of the base 13 from the guide member 38 toward the right side 27 of the base 13. The inner or left end of the shift bar 42 carries a pair of downwardly projected pins 43 and 44 disposed within the enlarged notches 36 and 37, respectively (Figs. 4 and 10). Outwardly, or to the right of the guide member 38 the shift bar 42 is formed with an elongated slot 52 and to the right of the slot 52 is provided with an upwardly projected pin 53.

A shift lever 46, extended transversely of the base 13 between the track members 19 and 21, is pivotally connected at its rear end by means of a pivot 47 to the underside of the track member 19 for pivotal movement in a horizontal plane between the solid line position and the dotted line position indicated at A in Fig. 4. The front end of the lever 46 extends beneath the track 21 and terminates forwardly of the track 21 in an upwardly and forwardly inclined handle portion 48.

The shift lever 46 is yieldably connected with the shift bar 42 to provide a bias in reversed directions on the shift bar 42 in response to a pivotally moved position of the shift lever 46. This is accomplished by means of an elongated wire spring member 54, extended generally longitudinally of the shift lever 46, with its rear end portion 56 secured to the shift lever and its front end portion 57 looped about a pin 53 projected upwardly from the right end portion 51 of the shift bar 42. Thus, when the shift lever 46 is in its full line position shown in Fig. 4, the spring member 54 biases the shift lever 46 towards the right as viewed in Fig. 4. However, the lever 46 is restrained against movement toward the right by contact with a pin 58 projected downwardly from the underside of the track 21.

Similarly, when the lever 46 is in its dotted line position shown in Fig. 4, the spring member biases the lever 46 toward the left, as viewed in Fig. 4, into contact with a pin 59 projected downwardly from the underside of the track 21. The pins 58 and 59 are spaced longitudinally of the track 21 with their lower ends spaced above the base 13 a distance greater than the thickness of the lever 46 so that the lever 46 can be depressed and disengaged from one of the pins 58 and 59 for movement into engagement with the other one of the pins 58 and 59.

When the shift lever 46 is in its full line position shown in Fig. 4, and the shift bar 42 is biased toward the left as viewed in Fig. 4, the pin 44 carried by the shift bar 42 is yieldably engaged in a notch 34 formed in the side 32 of the track 22, and the pin 43 carried by the shift bar 42 is positioned in the enlarged notch 36 formed in the guide bar 28. However, when the shift lever 46 is moved to its dotted line position shown in Fig. 4, the shift bar 42 is biased toward the right as viewed in Fig. 4, so that the pin 43 on the shift bar is yieldably engaged in a notch 33 formed in the side 31 of the track 32 and the pin 44 is positioned in the enlarged notch 37 formed in the guide bar 29.

Extended between and secured to the top sides of the front ends of the bars 28 and 29 (Figs. 4 and 5) is a supporting bar 61, arranged longitudinally of the base 13 and having a portion 62 extended outwardly or to the right from the guide bar 29. A horizontal plate member 60, of a substantially rectangular shape, is secured at its rear end to the supporting bar 61 and extends forwardly therefrom in a spaced relation above the track member 22 and the base 13. As best appears in Fig. 4, the right side 68 of the plate 60 terminates in the vertical plane of the right side 69 of the guide bar 29. Pivotally secured intermediate its ends to the underside of the projected bar portion 62, by means of a pivot 63, is a horizontal clutch lever 64 extended transversely of the base 13 with its front end inclined forwardly and upwardly and terminating in a handle portion 66. The rear end of the clutch lever 64 carries an upwardly projected pin 67 positioned in the slot 52 formed in the shift bar 42.

Thus, with the shift lever 46 in its full line position shown in Fig. 4, a clockwise pivotal movement of the clutch lever 64, as viewed in Fig. 4, moves the pin 67 into engagement with the right end 71 of the slot 52 (Figs. 4 and 10). Upon a further pivotal movement of the lever 64 against the bias of the spring 54, the shift bar 42 is moved to the right to disengage the pin 44, carried by the bar 42, from the notch 34a–d, inclusive. This clockwise movement of the clutch lever 64 is limited by the contact of that portion of the lever 64 located forwardly of the pivot 63 with the side 68 of the plate 60. With the lever 64 thus in contact with the plate 60, the notch engaging pins 43 and 44 carried by the shift bar 42 are disposed, respectively, in the enlarged notches 36 and 37 formed in the guide bars 28 and 29, respectively. Thus, while the lever 64 is held against the plate 60, the guide bars 28 and 29 and the tracks 19 and 21 carried thereon are movable along the track 22 transversely of the base 13. Upon release of the lever 64, the pin 44 is again free for a biased yieldable movement into one of the notches 34a–d, inclusive.

Conversely, with the shift lever 46 in its dotted line position, shown in Fig. 4, the pin 43 carried by the shift bar 42 is urged into one of the notches 33a and b, formed in the track 22, by virtue of the spring 54 biasing the shift bar 42 to the right, as viewed in Fig. 4. Upon a counterclockwise movement of the clutch lever 64, as viewed in Fig. 4, and a resultant movement of the pin 67 into contact with the left end 72 of the slot 52 formed in the shift bar 42, the shift bar 42 is moved to the left until further movement of the lever 64 is prevented by contact of that portion of the lever 64 located rearwardly of the pivot 63 with the side 69 of the guide bar 29. In this position of the lever 64, the pin 43 is held out of the notches 33a and b, against the bias of the spring 54, so that the pin 44 remains in the enlarged notch 37 formed in the guide bar 29. The guide bars 28 and 29 are thus manually movable along the track 22. When the lever 64 is released the pin 43 is again free to be moved, under the action of the spring 54, into a notch 33a and b. A stop member 50 secured to the top of the track 22 and extended outwardly from the sides of the track 22 is engageable with the rear track 19 and the U-shape guide member 38 to prevent the guide bars 28 and 29 being moved longitudinally off the ends of the track 22.

Carried on the top side of the plate 60 is the microswitch mechanism 11 which has an actuating member 73 extended transversely of the base 13 and mounted at its front end in an upright finger plate 74 positioned longitudinally of the base 13. A horizontal slide member 77 which is parallel with the actuating member 73 is secured at its front end to the finger plate 74 and terminates at its rear end in a notch engaging member 78 (Figs. 1, 4 and 5). The slide member 77 is mounted for sliding movement transversely of the base 13 within a guide member 79 secured to the plate 60. A compression spring 81 arranged within a central elongated slot 80 formed in the slide member 77 has one end engageable with the rear end 85 of the slot 80, and its other end engageable with a stop 82 projected downwardly from the guide member 79 into the slot 80. Thus, on manually gripping and moving the plate 74 forwardly, the slide member 77 is moved forwardly against the action of the spring 81, concurrently with a forward movement of the actuating member 73 out of a circuit closing position for the switch mechanism 11. On a release of the finger plate 74, the slide member 77 is moved rearwardly by the action of the spring 81 to a stop position defined by the engagement of the front end of the slot 80 with the guide stop 82. Concurrently with this rearward movement of the slide member 77, the switch actuating member 73 is moved rearwardly to a circuit closing position for the switch mechanism 11.

As previously described, the support frame 20 for the carriage 18 includes the track members 19 and 21. The carriage 18 consists of a flat sheet metal plate 83 provided on the top of its front end with a longitudinally extended strap member 84 the forward side 70 of which overhangs the front side 90 of the plate 83 and is formed with a series of six longitudinally spaced notches 86a–f, inclusive, adapted to receive the notch engaging member 78 (Figs. 1 and 5). Downwardly projected follower or guide members 87 positioned on opposite sides of the track 21 are provided at the front end of the plate 83 for maintaining the carriage 18 on the track 21. A forwardly projected handle 106 is secured to the notched member 84 to facilitate the manual sliding movement of the carriage 18 along the tracks 19 and 21. The rear end of the plate 83 is bent upon itself to form a longitudinally extended seat portion 88 for receiving a back slide member 95 which rests on and slides along the top side of the rear track 19. At its rear end the slide member 95 is bent upwardly to form with the plate 83 a channel 89 which receives the rear edge of a sheet of photographic paper (not shown) carried by the carriage 18 during a printing operation. A wire clamping member 91 is disposed in the channel 89 for releasably holding such paper on the carriage 18.

The notched member 84, as previously described, has six longitudinally spaced notches 86a–f, inclusive (Fig. 1), to provide for six adjusted positions of the carriage 18 longitudinally of the base 13, with these adjusted positions in turn providing for the printing of six rows of pictures on the photographic paper transversely of the carriage 18. In order to print larger pictures, the longitudinally adjusted positions of the carriage 18 may be varied by the provision of a lock-out bar 107, positioned on and extended longitudinally of the notch member 84. This lock-out bar 107, is formed along its front side with a pair of longitudinally spaced notches 108, which are spaced a distance apart equal to twice the spacing between the notches 86 in the notched member 84. On movement of the lock-out bar 107 transversely of the carriage 18, to a rearward position located rearwardly of the notches 86, as shown in Fig. 1, all of the notches 86 are open to receive the notch engaging member 78. On a forward movement of the lock-out bar 107 from its position shown in Fig. 1 to a position wherein the front side of the bar 107 is flush with the front side of the notched member 84, it will be seen that the notches indicated at 86b and 86d are closed against receiving the notch engaging member 78, and that the notch 86a is open and the notches 86c and 86e are in full registration with the notches 108 in the lock-out bar 107. As a result the carriage 18 is movable to three adjusted positions longitudinally of the base 13. The bar 107 is held in its forwardly and rearwardly moved positions by screws 109 threadable within corresponding threaded openings (not shown) formed in the notched member 84.

A forwardly projecting stop 111 is secured to the right end of the lock-out bar 107 (Fig. 1) for engaging the switch mechanism 11 upon extreme leftward movement of the carriage 18 to preclude use of the notch 86f formed at the extreme right end of the member 84 when the lock-out bar 107 is in its forwardly moved position.

The position of the lock-out bar 107, to vary the longitudinally adjusted positions of the carriage 18, is made concurrently with a shifting of the lever 46 to vary the transversely adjusted positions of the carriage 18. These adjusted positions are made relative to any changes in the size of the aperture or opening 17 of the aperture plate 16. The plate 16 is secured to a bracket 92, mounted at the rear end 14 of the base 13, by means of horizontal pivots 94 extended through upturned ends 93 on the bracket 92 and upstanding side flanges 96 formed at the sides of the plate 16 and positioned adjacent to and to the inside of the upturned ends 93. The plate 16 is pivotally moved upwardly and rearwardly away from the carriage 18, when the printing paper is positioned on and removed from the carriage 18, and is moved downwardly against the printing paper on the carriage, when the pictures are to be printed.

For decreasing the size of the opening 17 formed in the aperture plate 16, when pictures of a size smaller than the opening 17 are to be printed, there are provided a pair of aperture plate inserts 97 (Fig. 2) and 98 (Fig. 3). The insert 97 (Fig. 2) is formed with peripheral laterally offset portions 99 which rest on corresponding peripheral portions of the plate 16 surrounding the opening 17 when the insert 97 is in use. A pair of clamping fingers 100 and 101 secured to the plate 16 hold the insert 97 in position on the plate 16. The insert 97 includes a pair of diagonally arranged cut-out portions 102 and 103 with the cut-out portion 102 being smaller than the portion 103. In use, the insert 97, is applied to the plate 16 such that one of the cut-outs 102 and 103 is disposed in the lower left hand corner of the opening 17, as viewed in Fig. 1, depending upon whether the size of the picture to be printed corresponds to the size of the cut-out 102 or the cut-out 103.

The insert 98 (Fig. 3) is of a rectangular shape about half the size of the opening 17, and has a peripheral laterally offset portion 104 adapted to be positioned on a corresponding peripheral portion of the plate 16 surrounding the upper half of the opening 17. The clamping finger 100 is utilized to hold the insert 98 in place covering the upper half of the opening 17.

In one embodiment of the invention, the carriage 18 is of a size to carry a seven inch by fifteen inch sheet of photographic paper. The opening 17 in the plate 16 is of a size to provide for the printing of five inch by seven inch pictures and the insert 98 is of a size to cover one-half of the opening 17. The cut-out 102 in the insert 97 is of a size providing for the printing of one and three quarter inch by two and one-half inch pictures and the cut-out 103 provides for the printing of pictures two and one-half inches by three and one-half inches.

In the use of this embodiment of the invention, a sheet of seven inch by fifteen inch photographic paper is mounted on the carriage 18. Assume that five inch by seven inch pictures are to be printed on the sheet of paper (Figs. 1 and 9). The lock-out bar 107 is moved to a forward position in which the notches 86b, 86d, and 85f in the member 84 are locked out. The guide bars 28 and 29 are then moved rearwardly along the track 22 until the guide member 38 contacts the stop 50 on the track 22 as shown in Fig. 1.

The opening 17 in the aperture plate 16 is then arranged relative to a projection type photographic printer (not shown) such that the rays of light from the printer are directed toward the opening 17. The electric connection 12 is then connected to a photographic timer (not shown) of a usual type. With the apparatus thus arranged, each time the switch actuating member 73 closes the micro-switch mechanism 11, the photographic printer is operated for a time period controlled by the photographic timer and with a picture to be printed being of a size of the opening 17.

In this printing operation the finger plate 74 is manually moved forwardly against the bias of the spring 81 so as to move the switch actuating member 73 forwardly away from a circuit closing position for the switch 11. The carriage 18 is then moved to the right until the notch engaging member 78 is opposite the notch indicated as 86a. The member 74 is then released so that the spring 81 forces the actuating member 73 into a circuit closing position for the switch 11. The first picture is thus printed at the left end of the paper carried by the carriage 18. The member 74 is then again moved forwardly against the bias of the spring 81, concurrently with the removal of the notch engaging member 78 from the notch 86a.

With the notch engaging member 78 thus held in its retracted position, the carriage 18 is moved to the left as shown in Fig. 1 until the notch engaging member 78 is opposite the next adjacent registered notches 86c and 108 at which time the member 74 is again released. The actuating member 73 thus again closes the switch 11 whereby the printer is operated to print the second picture on the paper. The third picture is printed in a like manner by merely moving the carriage 18 until the notch engaging member 78 is opposite the right hand notch 108 in the lock-out bar 107. In this embodiment of the invention the notches 86a–f, inclusive, are about two and one-half inches apart so that by utilizing only alternate notches 86a–f, inclusive, the five inch by seven inch pictures, three in number, are arranged in a single row longitudinally of the paper.

For printing three and one-half inch by five inch size pictures, which are printed in two longitudinal rows each having three pictures, the insert 98 is clamped on the aperture plate 16 by the clamping finger 100 so as to cover the rear half of the opening 17 (Fig. 8). The lock-out bar 107 is retained in its forwardly moved position to lock out the notches 86b, 86d and 86f. The shift lever 46 is moved to its dotted line position shown in Fig. 4 for utilizing the pair of notches 33a and b formed in the track 22 which notches are spaced about three and one-half inches apart. The clutch lever 64 is then swung in a counterclockwise direction, as viewed in Fig. 4, to hold the pin 43 out of a notch 33a and b until the carriage 18 has been moved forwardly such that the pin 43 is aligned with the forward notch 33b. The lever 64 is then released to permit the pin 43 being moved into such forward notch 33b by the action of the spring 54. The carriage 18 is then moved to the left, as viewed in Fig. 1, and a first row of three pictures is printed in the manner described above for the five by seven pictures.

To print the second row of pictures, the clutch lever 64 is manipulated to move the pin 43 out of the forward notch 33b, and into the enlarged notch 36 in the guide bar 28 and the carriage 18 along with the guide bars 28 and 29 are then moved rearwardly along the track 22 until the pin 43 is positioned opposite the rear notch 33a for reception therein by the action of the spring 54. The carriage is then successively moved toward the right side 27 of the base 13 to print the second row of pictures.

For the printing of two and one-half inch by three and one-half inch size pictures, which are printed in two longitudinal rows each having six pictures therein, the insert 97 (Fig. 6) is clamped on the plate 16, by using the clamping fingers 100 and 101, so that the cut-out portion 103 of the insert 97 is disposed in the lower left hand corner of the opening 17 formed in the plate 16. The lock-out bar 107 is then moved to its rearward position, shown in Fig. 1, so that all of the notches 86a–f, inclusive, in the member 84 are free to receive the notch engaging member 78. The shift lever 46 is then moved to its dotted line position shown in Fig. 4 to provide for the reception of the pin 43 within the pair of notches 33a and b. The operation described above for printing three and one-half inch by five inch pictures is then repeated. However, since all of the notches 86, which are about two and one-half inches apart, are now being utilized, twice as many pictures are printed in a row when printing pictures two and one-half by three and one-half inch size than when printing the three and one-half inch by five inch pictures.

In the printing of the smallest size pictures, which are one and three quarter inches by two and one-half inches, the insert 97 (Fig. 7) is turned around so that the cut-out portion 102 is positioned in the lower left hand corner of the opening 17 formed in the aperture plate 16. The lock-out bar 107 is in its rearward position shown in Fig. 1. The shift lever 46 is then moved to its position shown in full lines in Fig. 4 so that the pin 44 carried by the shift bar 42 is urged by the spring member 54 toward and into the notches 34a–d, inclusive, formed in the track member 22. The clutch lever 64 is then manipulated to disengage the pin 44 from the notches 34a–d, inclusive, and the carriage 18 and guide bars 28 and 29 moved along the track 22 until the guide 38 contacts the stop 50. The pin 44 is then engaged in the most rearward notch 34a as shown in Fig. 3.

Starting with the carriage 18 in its extreme right hand position, as shown in Fig. 1, the carriage 18 is progressively moved to the left with the notch engaging member 78 engaging each of the notches 86a–f, inclusive. When the last notch 86f has been engaged, the clutch lever 64 is manipulated to disengage the pin 44 from the notch 34a and the carriage 18 moved forwardly until the pin 44 has engaged the next notch 34b. The carriage 18 is then progressively moved toward the right with the notch engaging member 78 engaging each of the notches 86a–f, inclusive, until the carriage 18 has again been moved to its extreme right hand position shown in Fig. 1. The carriage 18 is then moved forwardly to engage the pin 44 in the next notch 34c and the carriage 18 is again moved to the left after which the pin 44 is engaged in the forwardmost notch 34d and the carriage 18 again moved to the right. As a result, four rows of six pictures per row are thus printed on a seven inch by fifteen inch sheet of paper.

It is seen, therefore, that this invention provides an exposure device for printing a series of pictures on a single sheet of paper by merely moving the paper relative to a photographic printer so as to selectively expose adjacent areas of the paper. Pictures of various sizes can be printed by merely using the inserts 97 and 98 and moving the carriage 18 transversely and longitudinally of the base 13 in a predetermined mannner. By use of the lock-out bar 107 and the two rows of notches 33a and b and 34a–d, inclusive, formed on the track member 22, the movement of the carriage 18 to adjusted positions is controlled to conform to the size of the pictures being printed.

Although the invention has been described with respect to a preferred embodiment thereof, it is to be understood that it is not to be so limited, since changes can be made therein which are within the full intended scope of this invention as defined by the appended claims.

I claim:

1. For use with a photographic printer in the printing of a series of photographs on a single sheet of photographic paper, apparatus for printing rows of side by side pictures on said paper comprising a longitudinally extended base and track structure, a plate member secured in a parallel spaced relation to said base and track structure and having an exposure opening therein of a size corresponding to the size photograph to be printed, a paper carrying carriage mounted for sliding movement longitudinally and transversely on said structure, coacting engaging means on said carriage and said structure limiting transverse or longitudinal movement of said carriage to a distance corresponding, respectively, to the transverse or longitudinal dimension of said exposure opening whereby adjacent sections of said paper corresponding in size to the size of said exposure opening are successively exposed for the printing of photographs thereon, with one of said coacting means comprising a bar member on said structure having a series of notches formed in opposite sides thereof, a pair of notch engaging members carried by said carriage and arranged on opposite sides of said bar member, a single means for selectively biasing one of said notch engaging members toward the adjacent side of said bar member, and lever means operatively associated with said notch engaging members for moving said notch engaging members against the bias of said single means to positions out of engagement with said bar member.

2. For use with a projection type of photographic printer, an exposure device for printing a series of side by side photographs on a single sheet of photographic paper, said device comprising a base member, a plate member secured in a substantially parallel spaced relation to said base member, said plate member having an exposure opening therein, means for varying the size of said opening to correspond to the size photograph to be printed, track means on said base member, a paper carrying carriage mounted for linear movement on said track means between said base member and said plate member, said carriage having a series of notches formed along one side thereof, releasable notch engaging means on said base biased into engagement with the carriage at the notches in said carriage, a lock-out member attachable to said carriage along said one side thereof for closing some of said notches against receiving said notch engaging means so that the distance between adjacent notches corresponds to that dimension of said exposure opening extended parallel to the linear movement of said carriage, and switch means operatively associated with said notch engaging means for operating said printer in response to movement of said notch engaging means into engagement with said carriage at the notches.

References Cited in the file of this patent

UNITED STATES PATENTS

| | | |
|---|---|---|
| 2,167,298 | Hardy | July 25, 1939 |
| 2,172,283 | Kirby | Sept. 5, 1939 |
| 2,335,697 | Reyniers | Nov. 30, 1943 |
| 2,369,981 | Reyniers | Feb. 20, 1945 |